United States Patent
Kumar et al.

(10) Patent No.: US 9,007,920 B2
(45) Date of Patent: Apr. 14, 2015

(54) QOS IN HETEROGENEOUS NOC BY ASSIGNING WEIGHTS TO NOC NODE CHANNELS AND USING WEIGHTED ARBITRATION AT NOC NODES

(71) Applicants: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(72) Inventors: Sailesh Kumar, San Jose, CA (US);
Eric Norige, East Lansing, MI (US);
Joji Philip, San Jose, CA (US);
Mahmud Hassan, San Carlos, CA (US);
Sundari Mitra, Saratoga, CA (US);
Joseph Rowlands, San Jose, CA (US)

(73) Assignee: NetSpeed Systems, San Jose, CA (US)

( * ) Notice: Subject to any disclaimer, the term of this patent is extended or adjusted under 35 U.S.C. 154(b) by 161 days.

(21) Appl. No.: 13/745,696

(22) Filed: Jan. 18, 2013

(65) Prior Publication Data
US 2014/0204764 A1    Jul. 24, 2014

(51) Int. Cl.
*H04L 5/00* (2006.01)
*H04L 12/725* (2013.01)

(52) U.S. Cl.
CPC ............ *H04L 5/0035* (2013.01); *H04L 45/302* (2013.01)

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,564,865 B2 * | 7/2009 | Radulescu | 370/458 |
| 7,590,959 B2 | 9/2009 | Tanaka | |
| 7,724,735 B2 * | 5/2010 | Locatelli et al. | 370/389 |

(Continued)

FOREIGN PATENT DOCUMENTS

| CN | 103684961 A | 3/2014 |
|---|---|---|
| WO | 2014059024 A1 | 4/2014 |

OTHER PUBLICATIONS

Falko et al., Fair rate packet arbitration in Network-on-Chip, Sep. 26-28, 2011, IEEE.*

(Continued)

*Primary Examiner* — Hassan Kizou
*Assistant Examiner* — Tejis Daya
(74) *Attorney, Agent, or Firm* — Procopio, Cory, Hargreaves & Savitch LLP (57) ABSTRACT

Systems and methods described herein are directed to solutions for NoC interconnects that provide end-to-end uniform- and weighted-fair allocation of resource bandwidths among various contenders. The example implementations are fully distributed and involve computing weights for various channels in a network on chip (NoC) based on the bandwidth requirements of flows at the channels. Example implementations may involve using the weights to perform weighted arbitration between channels in the NoC to provide quality of service (QoS). The weights may be adjusted dynamically by monitoring the activity of flows at the channels. The newly adjusted weights can be used to perform the weighted arbitrations to avoid unfair bandwidth allocations.

14 Claims, 11 Drawing Sheets

(56) References Cited

U.S. PATENT DOCUMENTS

| | | | |
|---|---|---|---|
| 7,725,859 | B1 | 5/2010 | Lenahan et al. |
| 7,808,968 | B1 | 10/2010 | Kalmanek, Jr. et al. |
| 7,917,885 | B2 | 3/2011 | Becker |
| 7,957,381 | B2 * | 6/2011 | Clermidy et al. ............ 370/392 |
| 8,050,256 | B1 | 11/2011 | Bao et al. |
| 8,059,551 | B2 | 11/2011 | Milliken |
| 8,099,757 | B2 | 1/2012 | Riedle et al. |
| 8,136,071 | B2 | 3/2012 | Solomon |
| 8,203,938 | B2 * | 6/2012 | Gibbings ................. 370/228 |
| 8,281,297 | B2 | 10/2012 | Dasu et al. |
| 8,312,402 | B1 | 11/2012 | Okhmatovski et al. |
| 8,412,795 | B2 * | 4/2013 | Mangano et al. ............ 709/217 |
| 8,448,102 | B2 | 5/2013 | Kornachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,635,577 | B2 | 1/2014 | Kazda et al. |
| 8,667,439 | B1 | 3/2014 | Kumar et al. |
| 8,705,368 | B1 * | 4/2014 | Abts et al. .............. 370/238 |
| 8,717,875 | B2 | 5/2014 | Bejerano et al. |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2004/0216072 | A1 | 10/2004 | Alpert et al. |
| 2005/0147081 | A1 | 7/2005 | Acharya et al. |
| 2006/0161875 | A1 | 7/2006 | Rhee |
| 2006/0209846 | A1 * | 9/2006 | Clermidy et al. ............ 370/400 |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0072182 | A1 | 3/2008 | He et al. |
| 2008/0120129 | A1 | 5/2008 | Seubert et al. |
| 2008/0232387 | A1 * | 9/2008 | Rijpkema et al. ............ 370/420 |
| 2009/0070726 | A1 | 3/2009 | Mehrotra et al. |
| 2009/0268677 | A1 * | 10/2009 | Chou et al. ................ 370/329 |
| 2009/0313592 | A1 | 12/2009 | Murali et al. |
| 2010/0040162 | A1 | 2/2010 | Suehiro |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0276937 | A1 | 11/2011 | Waller |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0110541 | A1 | 5/2012 | Ge et al. |
| 2012/0155250 | A1 | 6/2012 | Carney et al. |
| 2013/0051397 | A1 * | 2/2013 | Guo et al. ................ 370/400 |
| 2013/0080073 | A1 | 3/2013 | de Corral |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |

OTHER PUBLICATIONS

Lee et al., Probabilistic Distance-based Arbitration:Providing Equality of Service for Many-core CMPs, Dec. 4-8, 2010, IEEE.*

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

QOS IN HETEROGENEOUS NOC BY ASSIGNING WEIGHTS TO NOC NODE CHANNELS AND USING WEIGHTED ARBITRATION AT NOC NODES

BACKGROUND

1. Technical Field

Methods and example implementations described herein are generally directed to interconnect architecture, and more specifically, to weight assignment and weighted arbitration of node channels in a Network on Chip (NoC) system interconnect architecture.

2. Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

Figure 1A:
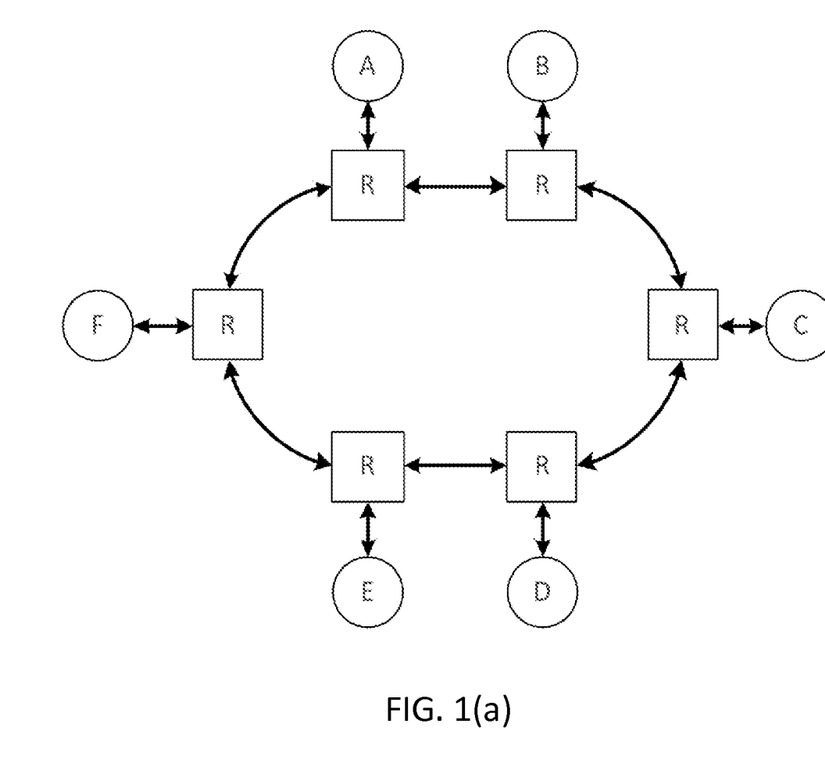
FIGS. 1(a), 1(b) 1(c) and 1(d) illustrate examples of Bidirectional ring, 2D Mesh, 2D Taurus, and 3D Mesh NoC Topologies.
Figure 1B:
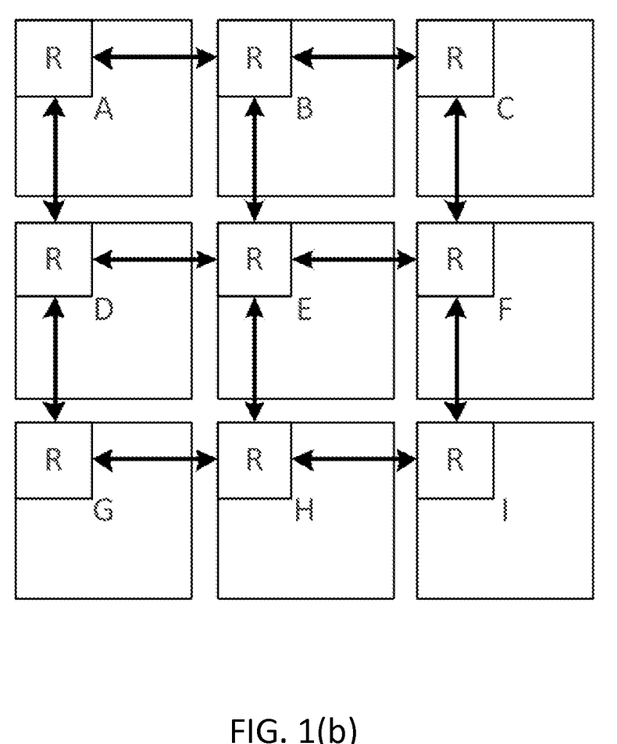
Figure 1C:
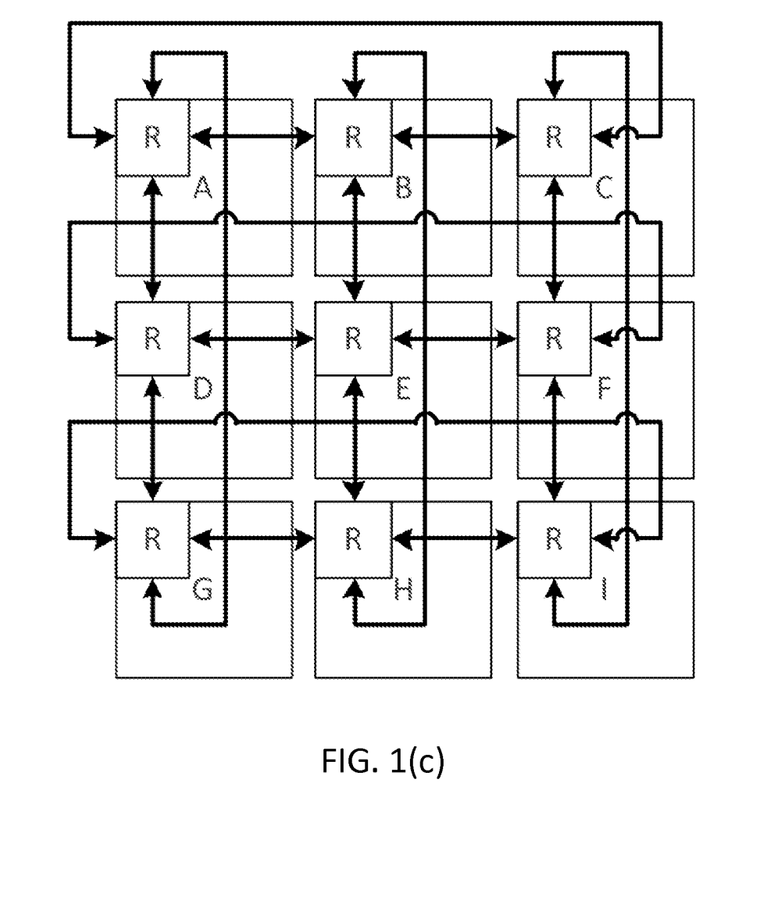
Figure 1D:
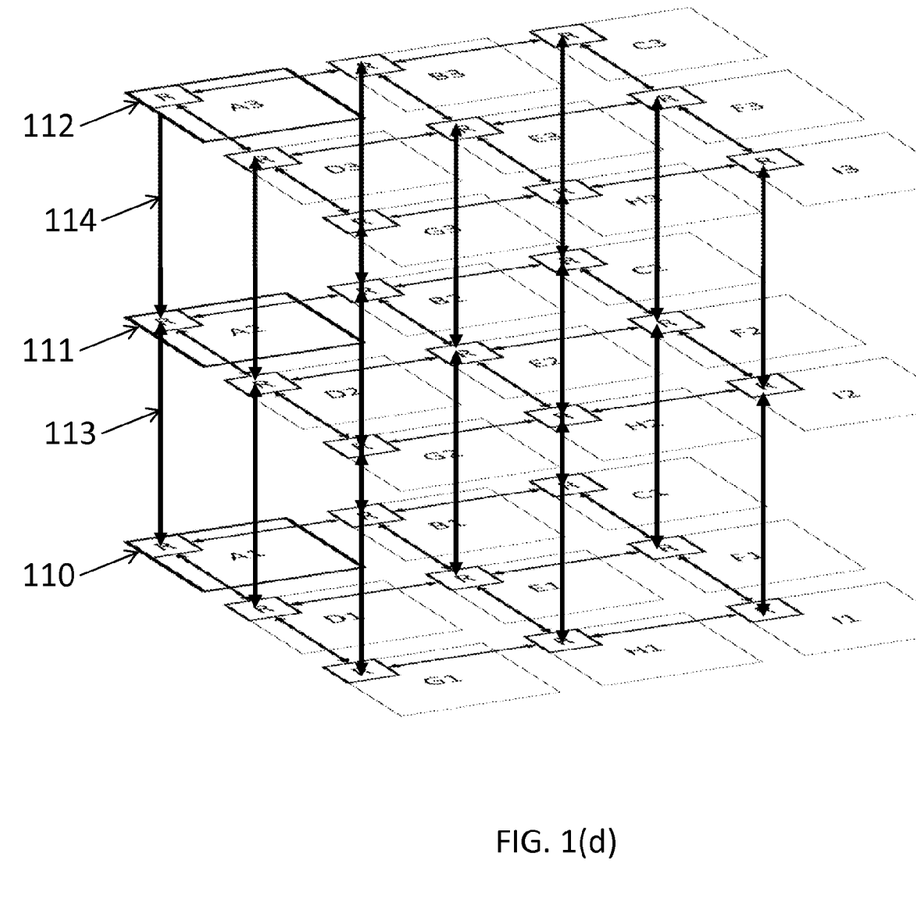

There are several topologies in which the routers can connect to one another to create the system network. Bi-directional rings (as shown in FIG. 1(a)), 2-D (two dimensional) mesh (as shown in FIG. 1(b)) and 2-D Taurus (as shown in FIG. 1(c)) are examples of topologies in the related art. Mesh and Taurus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to the router in the higher layer, and another connecting to the router in the lower layer. Router 111 in the middle layer of the example has both ports used one connecting to the router at the top layer and another connecting to the router at the bottom layer. Routers 110 and 112 are at the bottom and top mesh layers respectively, therefore they have only the upper facing and lower facing ports of the two additional ports used. The interlayer ports or channels between these three routers are 113 and 114.

Packets are message transport units for intercommunication between various components. Routing involves identifying a path composed of a set of routers and physical links of the network over which packets are sent from a source to a destination. Components are connected to one or multiple ports of one or multiple routers, with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may be implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing is often minimal turn and shortest path routing.

Figure 2:
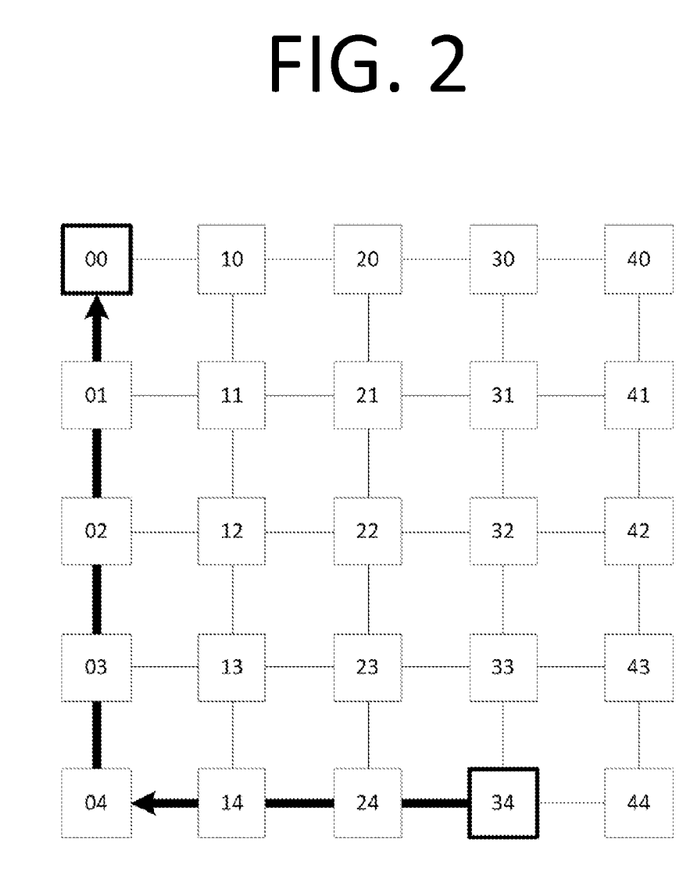
FIG. 2 illustrates an example of XY routing in a related art two dimensional mesh.

FIG. 2 pictorially illustrates an example of XY routing in a two dimensional mesh. More specifically, FIG. 2 illustrates XY routing from node '34' to node '00'. In the example of FIG. 2, each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. During congestion, when multiple sources transmit messages to the same destination, their messages may contend with each other and with the cross-traffic for the bandwidth. Therefore, the effective destination bandwidth received by each source will depend on their positions in the network, how their routes overlap with each other, cross-traffic along their routes to the destination, and the arbitration policies deployed at various routers where arbitration is needed. In spite of uniformly fair arbitration policies at all routers, depending on location of various sources there may be a substantial difference in the destination bandwidth received.

Figure 3:
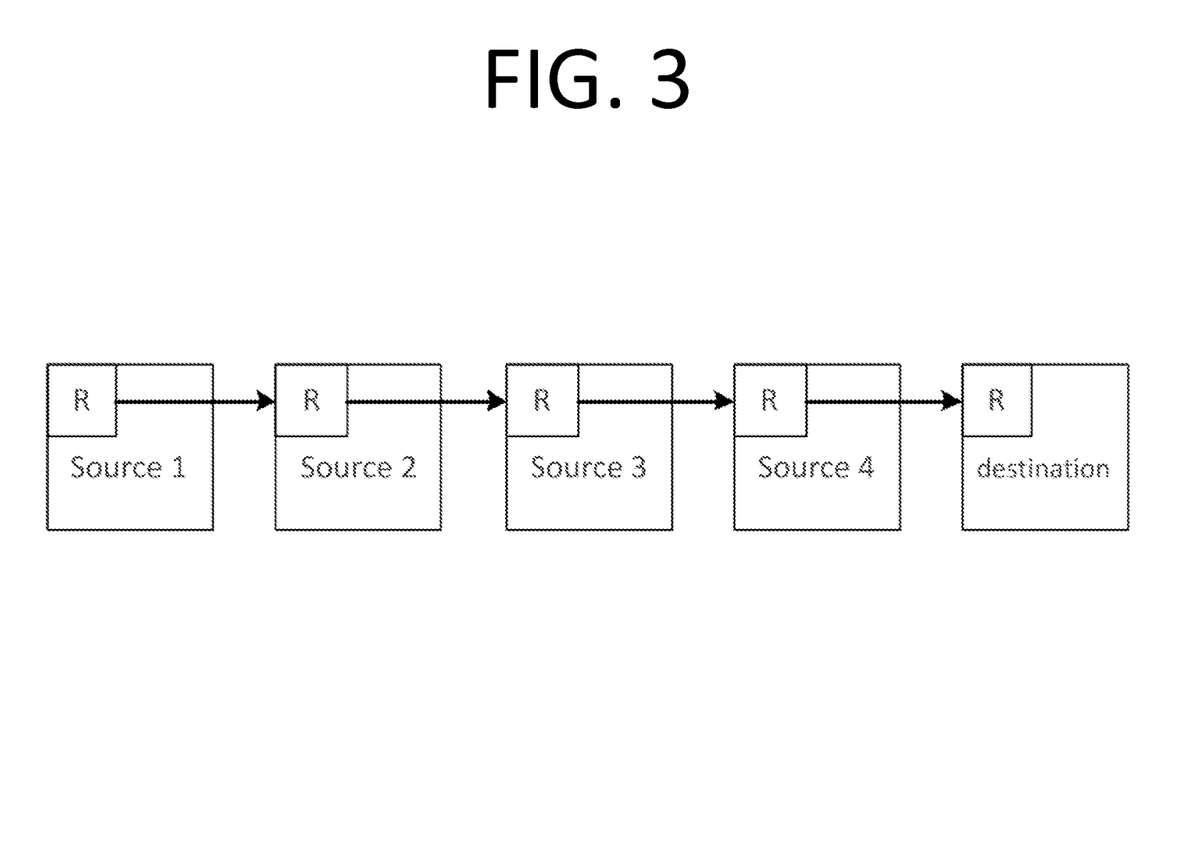
FIG. 3 illustrates an example of a NoC interconnect.

Consider a section of a NoC interconnect shown in FIG. 3, wherein four components (source 1, source 2, source 3, and source 4) transmit messages to one component (destination). In this example, the maximum data transmit bandwidth of the four source components is equal to the maximum data receive bandwidth of the destination component. Each of the five components are connected to a local router node, and the router nodes are connected with each other using point to point channels as shown in FIG. 3. In the example of FIG. 3, each of the channels have a receive bandwidth of the destination component equal to a transmit bandwidth of the source component.

In the system shown in FIG. 3, if all four source components attempt to transmit data at their peak transmit rate and if the destination component is ready to accept data at its peak receive rate, then messages from the four source components will contend with each other within the NoC interconnect.

Figure 4:
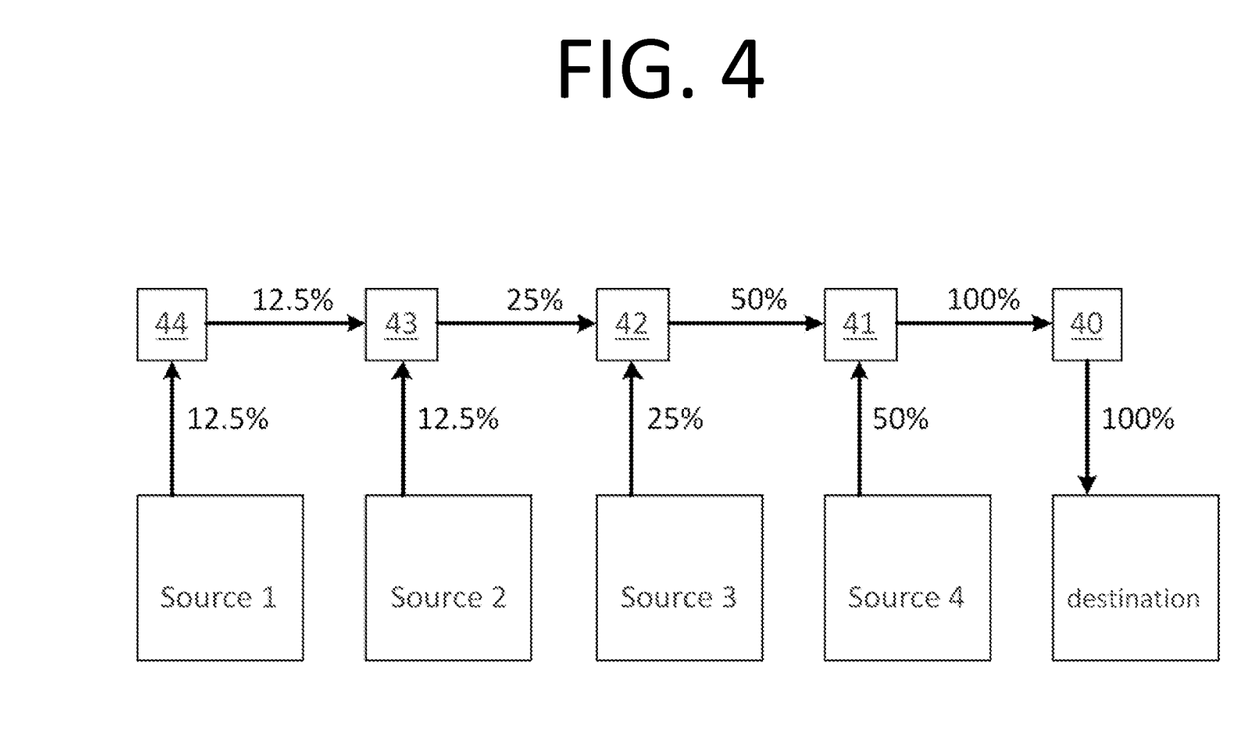
FIG. 4 illustrates a NoC interconnect with routers and interconnects separated for clarity and bandwidth received by various channels.

In FIG. 4, the routers and components are separated for clarity the channels that connect components with their local routers are illustrated.

At router 41 in FIG. 4, messages arriving at the left input port (e.g., from router 42) and the bottom input port (e.g., from source 4) will contend for the right output port (e.g., to router 40). If routers implement uniformly fair arbitration policy to arbitrate between incoming messages at different input ports contending for an output port, then the output port's bandwidth will be equally split between the two input ports as shown. Each input port will receive 50% of the destination bandwidth—source 4 therefore will receive half of the destination bandwidth.

At router 42 in FIG. 4, messages arriving at the left input port (e.g. from router 43) and bottom input port (e.g., from source 3) will contend for the right output port. If routers implement uniformly fair arbitration policy to arbitrate between incoming messages at different input ports contending for an output port, then the 50% output port's bandwidth (computed in the above step) will be equally split between the two input ports as shown. Each input port will receive 25% of the destination bandwidth—source 3 therefore will receive a quarter of the destination bandwidth.

At router 43 in FIG. 4, messages arriving at the left input port (e.g., from router 44) and bottom input port (e.g., from source 2) will contend for the right output port (e.g., to router 42). If routers implement uniformly fair arbitration policy to arbitrate between incoming messages at different input ports contending for an output port, then the 25% output port's bandwidth (computed in the above step) will be equally split between the two input ports as shown. Each input port will receive 12.5% of the destination bandwidth—source 2 therefore will receive 12.5% of the destination bandwidth. The remaining 12.5% bandwidth will be received by source 1.

The example of FIG. 4 illustrates that even though each router employs a uniformly fair arbitration policy wherein the router gives fair share of output port bandwidth among all input port contenders, the four sources receive vastly different shares of the destination bandwidth. In a complex network with additional cross-traffic, the bandwidth allocated to various source components when they content for various destinations may vary substantially. This may be undesirable in many applications, wherein fair or equal allocation of various resources among all contenders may be important to achieve a high system performance. In many systems, weighted allocation is desired, so that the various resource bandwidths are allocated among various contenders in a pre-specified ratio.

There are several techniques in the related art to provide uniform or weighted fair arbitration within a single router, wherein the output port bandwidth is allocated to contending input ports based on the weight specification. Weighted round-robin, deficit round-robin, weighted fair queuing, etc. are a few techniques that are used in the related art. Guaranteeing weighted- or uniform-allocation of various resources among contenders in a distributed NoC interconnect with resources and contenders connected at arbitrary positions in the NoC interconnect is challenging. A few techniques that are used in the related art are described below.

Rate limiting the sources: Each source contending for a resource destination is allowed to send data at a pre-specified rate based on its fair share. This technique is independent of the state of other sources, whether the other sources are contending for the resource or not. Therefore, based upon the pre-specified rates of sources, rate limiting of the sources can either lead to under-utilization of resource bandwidth, or unfair allocation.

Age based arbitration: Every message injected by various components carries timestamp information, which describes the age of the message. Within the NoC interconnect, routers give higher preference to older messages over newer messages, whenever multiple messages content for an output port. This technique can provide end-to-end uniform fairness, however it is unable to provide weighted fairness. Furthermore, age based arbitration comes at a high implementation cost of additional bits needed to carry the age information and complex circuitry at every router to determine the oldest message.

SUMMARY

Aspects of the present application include a method, which may involve computing weights for various channels in a network on chip (NoC) based on the bandwidth requirements of flows at the channels; using the weights to perform weighted arbitration between channels in the NoC to provide QoS; dynamically adjusting the weights by monitoring the activity of flows at the channels to avoid unfair allocations, and performing weighted arbitration using the newly computed channel weights.

Aspects of the present application include a computer readable storage medium storing instructions for executing a process. The process may involve computing weights for various channels in a network on chip (NoC) based on the bandwidth requirements of flows at the channels; using the weights to perform weighted arbitration between channels in the NoC to provide QoS; dynamically adjusting the weights by monitoring the activity of flows at the channels to avoid unfair allocations, and performing weighted arbitration using the newly computed channel weights.

Aspects of the present application include a system, which may involve a weight allocation module for computing weights for various channels in a network on chip (NoC) based on the bandwidth requirements of flows at the channels; a weighted arbitration module for using the weights to perform weighted arbitration between channels in the NoC to provide QoS; a weight adjustment module dynamically adjusting the weights by monitoring the activity of flows at the channels to avoid unfair allocations, and having the weighted arbitration by the weighted arbitration module by using the newly computed channel weights.

DETAILED DESCRIPTION

Example implementations of the present application involve arbitration by configuring router port weights and using the weights for local arbitration at the routers. Such weighted arbitration schemes have been employed in Internet traffic management, but not in a mesh or Taurus 2-D, 2.5-D or 3-D NoC interconnects. Assigning weights presents some difficulty in implementing such a solution, as well other problems. For example, if all of the sources are participating, then a configuration of router port weights may provide fair allocation. However when several sources are not contending for the resources, then unfair allocation may occur, and it may be difficult to adjust weights in such scenarios. When multiple flows between different sets of source and destination pairs share a channel, there is some difficulty in ensuring that the two flows get their fair share of bandwidth and are not affected by each other. If multiple virtual or physical channels are used to isolate the two flows then there is additional difficulty with respect to how the weights are assigned to the channels. The example implementations described herein are directed to resolving such difficulties.

In a distributed NoC interconnect connecting various resources and components with each other using multiple routers and point to point links between the routers, unfair allocation of resource bandwidth may occur to various contending components depending upon their locations in the NoC topology, despite every router performing a fair arbitration locally among its input channels contending for an output channel.

Example implementations described herein are directed to solutions for 2-D, 2.5-D and 3-D NoC interconnects that provide end-to-end uniform-fair and weighted-fair allocation of resource bandwidths among various contending components. The example implementations are fully distributed and involve assigning weights to various channels of the NoC interconnect based on the system traffic Quality of Service (QoS) specification, and performing weighted arbitrations between various channels at the NoC nodes based on the weight of the channels. A sample design for implementation of weighted arbitration between multiple channels at a NoC node is also described.

Example implementations further involve computing the weight of various channels based on the bandwidth specification of traffic flows that go over the channels. The flows that go over a channel depend upon the routes that are being used in the NoC, and the routes may be adjusted to balance the weights of various channels.

Example implementations also involve optionally updating the channel weights dynamically based on the traffic conditions in the network. Each node may monitor the traffic flows that are currently active and contending for the resources and those that are currently inactive, and accordingly update the weights of the channels to avoid any unfair bandwidth allocations. Further, some or all weights may be dynamically updated, and some weights may be set as permanently static weights with no adjustments used, depending on the desired implementation.

Example implementations of computing the weights to be assigned to various channels and performing weighted arbitration at various nodes to achieve end-to-end QoS and fair allocation of resources are described below. All traffic flows between all pairs of source and destination nodes are first routed using the default routes that avoids deadlock and meets the QoS isolation properties. Subsequently, at every virtual and physical channel in the NoC, the bandwidth requirements of the flows over the channel are added together, to obtain the total bandwidth requirement at the channel. Peak or average bandwidth numbers may be used based on the system performance specification. The resulting bandwidth requirement of NoC channels can be used directly as their weights; however a large number of bits may be required to represent the weights if there is a high degree of bandwidth disparity between various NoC channels. This may also complicate the weighted arbitration logic. In an implementation of the system, the weight of a channel may be restricted to use a certain maximum number of bits, say n-bits.

To represent channel's bandwidth using n-bit weights, they may be normalized first. Instead of normalizing with respect to the maximum bandwidth value across the entire NoC, the bandwidth of a channel at a node may be normalized with respect to the maximum bandwidth of all channels at the node. Such normalization can be utilized because any channel at a node only competes with other channels at this node during arbitration. Additional implementations may further normalize with respect to the maximum bandwidth of only those channels at this node with which this channel contends with. The normalized bandwidth numbers are then multiplied by $2^n$, and the integer part of the result is represented with n-bits, which is used as the weight of the channels. Since a channel's bandwidth is normalized over only the channels present at the same node or the ones that contents with this channel as opposed to all NoC channels, the normalization may result in the best possible approximation of channel bandwidth to n-bit weights with a minimum loss of information. Such normalization can be useful as the bandwidth at various channels may differ widely in a heterogeneous mesh (see, for example, U.S. patent application Ser. No. 13/647,557, herein incorporated by reference in its entirety for all purposes), or Taurus NoC, especially in a 2.5-D or 3-D organization.

Figure 5:
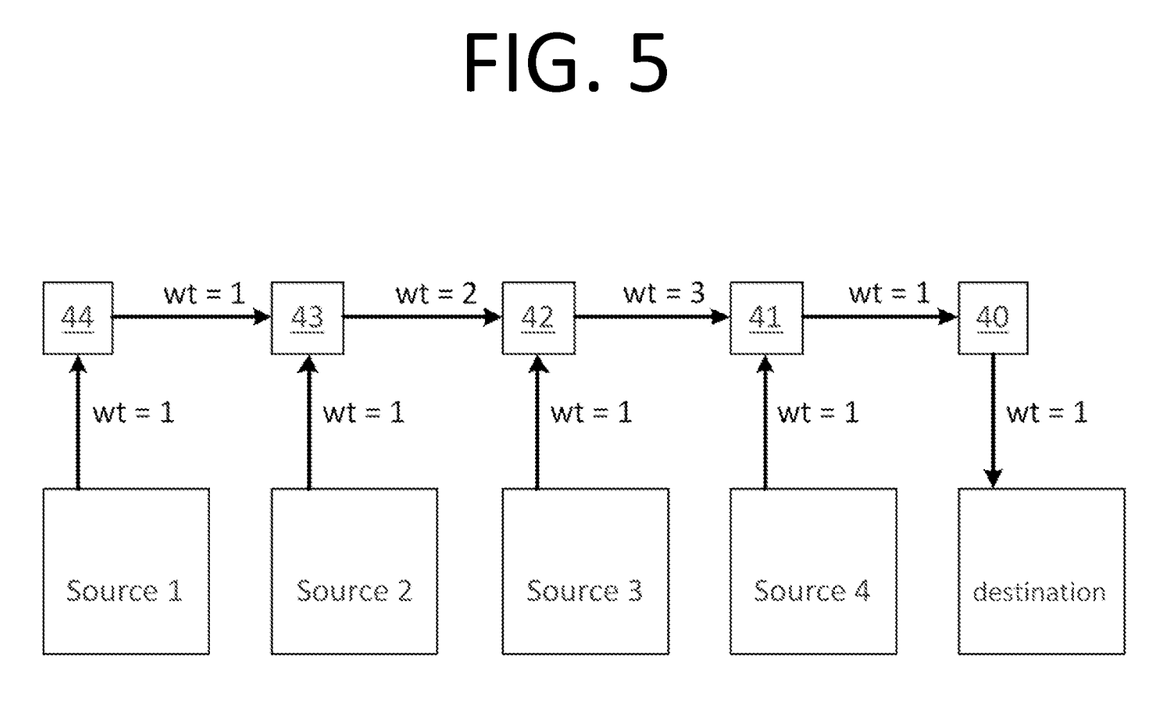
FIG. 5 illustrates an example assignment of weights to various NoC channels, in accordance with an example implementation.

Using this scheme, an example assignment of weights to various channels of the NoC illustrated in FIG. 4 is shown in FIG. 5. There are four flows from four sources which are contending for the destination's bandwidth. Assume that each flow needs to share the bandwidth equally. At node 40, the bandwidth at the incoming channel and the outgoing channel is same, therefore after normalization their weights are 1. At node 41, the bandwidth requirement of the incoming channel from left is three times the bandwidth requirement of the incoming channel at the bottom, as there are three flows being carried on the former channel versus only one flow at the latter. Therefore the weights are 3 and 1 respectively. Similarly, weights of the left and bottom incoming channels at node 42 are 2 and 1 respectively and at node 43 are 1 and 1 respectively. With this weight assignment, if weighted arbitration is performed at all nodes then fair allocation of destination bandwidth may be provided to all sources.

Figure 6:
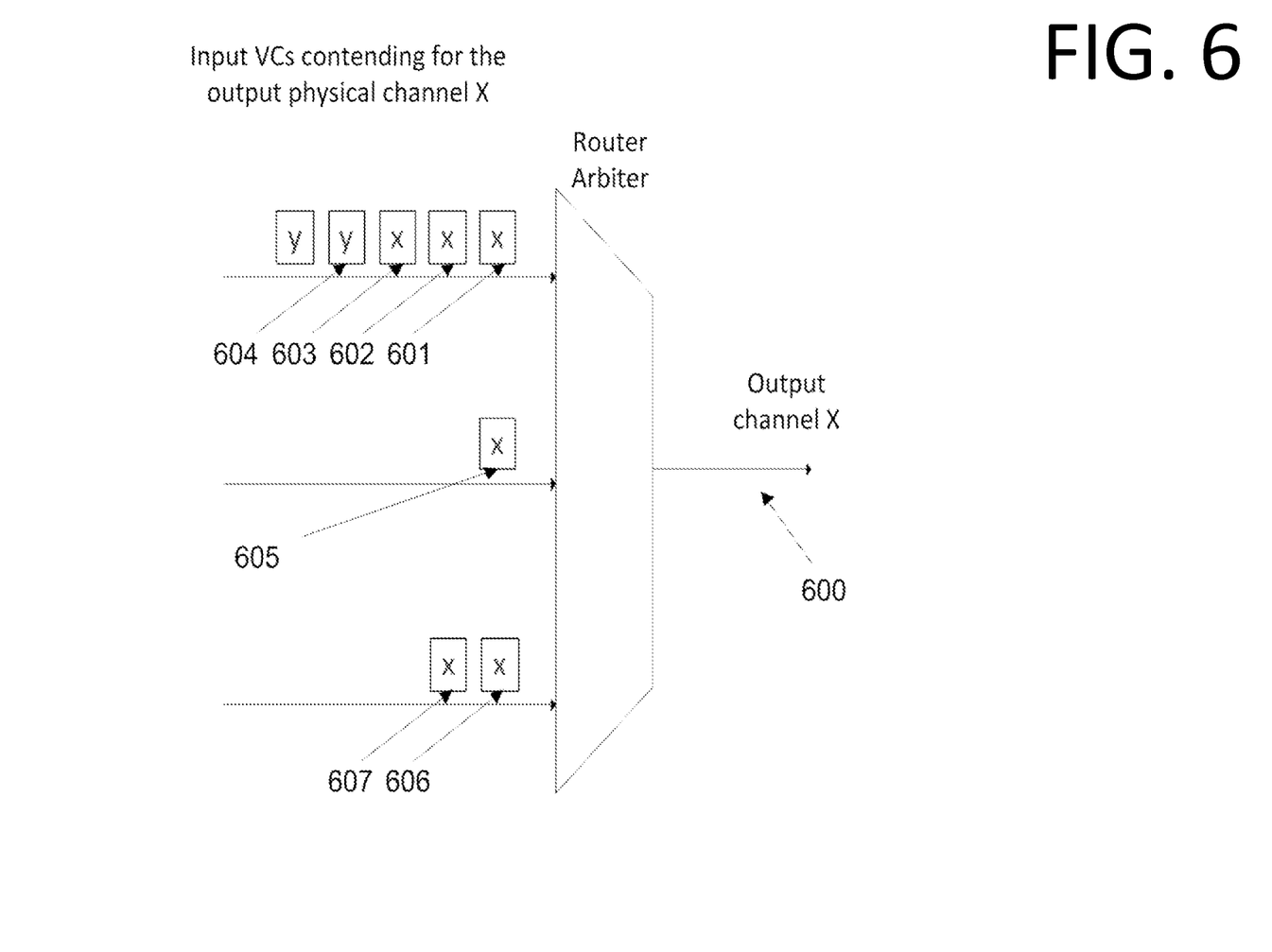
FIG. 6 illustrates the flow chart to compute the weight of various channels using their bandwidth requirement and then performing weight round robin arbitrations at each router, in accordance with an example implementation.

The example weight computation and weighted arbitration first lists all flows between source and destination pairs that traverse various channels of the NoC (step 600 in FIG. 6). Then for all channels, based on its flows, its maximum bandwidth requirement is computed (step 601 in FIG. 6). Once the bandwidth requirements are known, at each router, the bandwidth requirement of each of its channels is normalized with respect to the router channel that has the highest bandwidth requirement and then represented using a n-bit weight value (step 602 in FIG. 6). Finally, once all weight values of all channels are known, the weight round robin arbitration policy is implemented at all routers (step 603 in FIG. 6).

An example implementation of weighted arbitration at the NoC nodes is described below. At a NoC node there may exist multiple incoming and outgoing physical channels, and within each physical channel, there may be multiple virtual channels. In a standard node design, during every cycle, multiple input VCs may contend for each output virtual channel. Once an input VC wins the arbitration for an output VC, the VC is assigned to the input for an entire packet which may be composed of multiple flits. After VC arbitration, the input VCs that got an output VC assigned, arbitrate for the output physical channel since in one cycle only one flit can be transmitted on a physical channel. During this arbitration, multiple VCs may be interleaved on a physical channel; in a fair arbitration, each VC contending for the output physical channel sends one flit per cycle in a round robin order. To implement a weighted arbitration, deficit counter based weighted round robin system may be used. In this design when a VC's chance to transmit a flit on the output channel comes in the round-robin order, the VC is allowed to send up to w flits over the next several cycles, where w is the weight of the VC. After w flits are transmitted (or if VC becomes empty or the VC does not have any more flits to send to this output channel), the round robin order proceeds to serve the next input VC. During the entire period over which up to w flits are transmitted, the output VC assigned to the input VC remains assigned to it even if an End of Packet (EOP) flit appears, as long as there are more packets at the input VC to be sent to the output channel. Output VCs continues to be freed up at the packet completion, i.e. upon an EOP flit.

To track whether w flits are transmitted or not, a counter may be needed at every input VC, with the counter being at least as wide as the VC's weight. Whenever the VCs chance arrives in the round robin order to transmit a flit, the counter is reset to the VC's weight and is decremented by one every time the VC is able to send a flit. VC continues to win the arbitration at the output physical channel until counter becomes 0, or VC becomes empty, or VC does not have any more packets to send at the current output.

Figure 7:
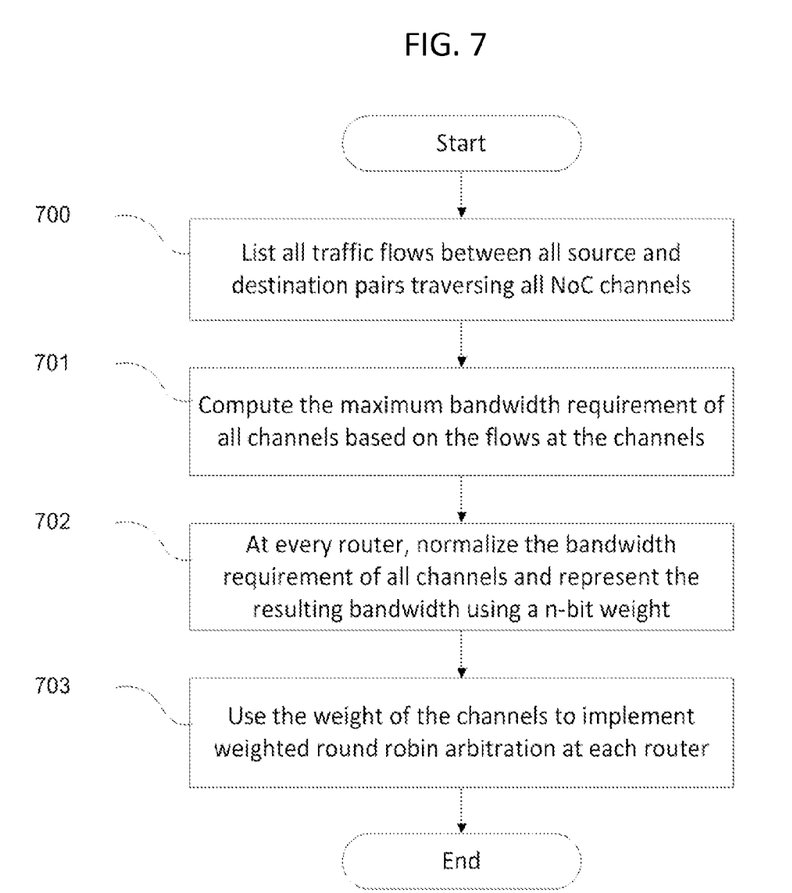
FIG. 7 illustrates a router's arbiter in accordance with an example implementation.

FIG. 7 illustrates an example of such weighted arbitration at a NoC node between three input VCs. The three input VCs have packets for the same physical channel X 700 and has been assigned an output VC. Let each input VC has weight 2, and the round robin pointer is at the first VC. First VC has 5 single flit packets; the first three packets 701, 702, 703 are to be sent to channel X, while the next packet 704 is to be sent over another physical channel Y. If the deficit counter of the VC is 2, the VC will win arbitration for the physical channel during next two cycles, and will be able to send packets 701 and 702. At this time, the deficit counter of the VC will become zero, and the round robin pointer will move to the second input VC; the output VC assigned to the first input VC stays assigned. The second input VC has a single packet 705 to be sent to channel X; after it is transmitted, the input channel becomes empty. The output VC assigned to this input VC is freed up and the round robin pointer moves to the third input VC. The third VC has two packets 706 and 707, which are transmitted over next two cycles, and then the VC becomes empty as well as its deficit counter becomes zero. The output VC assigned to the input VC is freed up and the round robin pointer advances, comes back to the first input VC. Packet 703 is transmitted in the next cycle. The next packet 704 does not go on the output channel X, therefore the output VC assigned to the first input VC is freed up; this input VC will now contend for a VC at the output channel Y. Arbitration for the output channel X stops at this point, unless there are new packets that arrived at some input VC and has an output VC at channel X assigned to them.

The example implementation is fully distributed as weighted arbitrations are performed locally at every node between the channels present at the node. The example implementation can scale well with increasing number of nodes in the NoC and can provide uniform and weighted allocation when all flows are active and contending for the resources. However, there may be unfair allocation when certain flows are not active in the system. Consider the example shown in FIG. 5. If in this system source 1 and source 2 are not contending for the destination, then only flows from source 3 and source 4 will arbitrate at node 41. Based on the configured channel weights, source 3 will receive three times more bandwidth than source 4. The unfair allocation occurs because the weights are statically configured. When some flows are not active in a group of flows at a channel, then the active flows may receive the unused bandwidth provisioned for the inactive flows, thereby receiving unfair bandwidth. To address this, dynamic adjustments to the channel's weights based on the activity of various flows is proposed. In such a design, various channels at various NoC nodes may monitor the state of certain flows. When a flow becomes inactive at a channel, the channel's weight is reduced by the equivalent of flow's bandwidth. When a flow becomes active again, the channel's weight is incremented. A flow may be defined to be active at a channel, if at least one packet has been received at the channel over certain fixed time period. If no packets have been received during this time period then the flow is assumed inactive. The time period may be defined based on the bandwidth of the slowest flow on the channel, or on the node or in the entire NoC. For every channel a timer is kept which expires after this time period.

An example implementation to efficiently track per-channel's flow activity uses a bit-vector per channel with one bit for every flow on the channel. Whenever a packet of a flow arrives, the corresponding bit in the bit-vector is set. Every time the timer expires, all bits are examined; if a bit is not set then the corresponding flow is assumed inactive. After all bits are examined, the bit-vector is cleared. Based on the status of the flows on the channel, the channel's weight is recomputed. Alternative implementations to further reduce the number of bits needed per channel may be employed such as compressed bit vector, where a single bit tracks the activity of a group of flows, instead of a single flow. A Bloom filter may also be used to represent the set of active flows on a channel.

Figure 8:
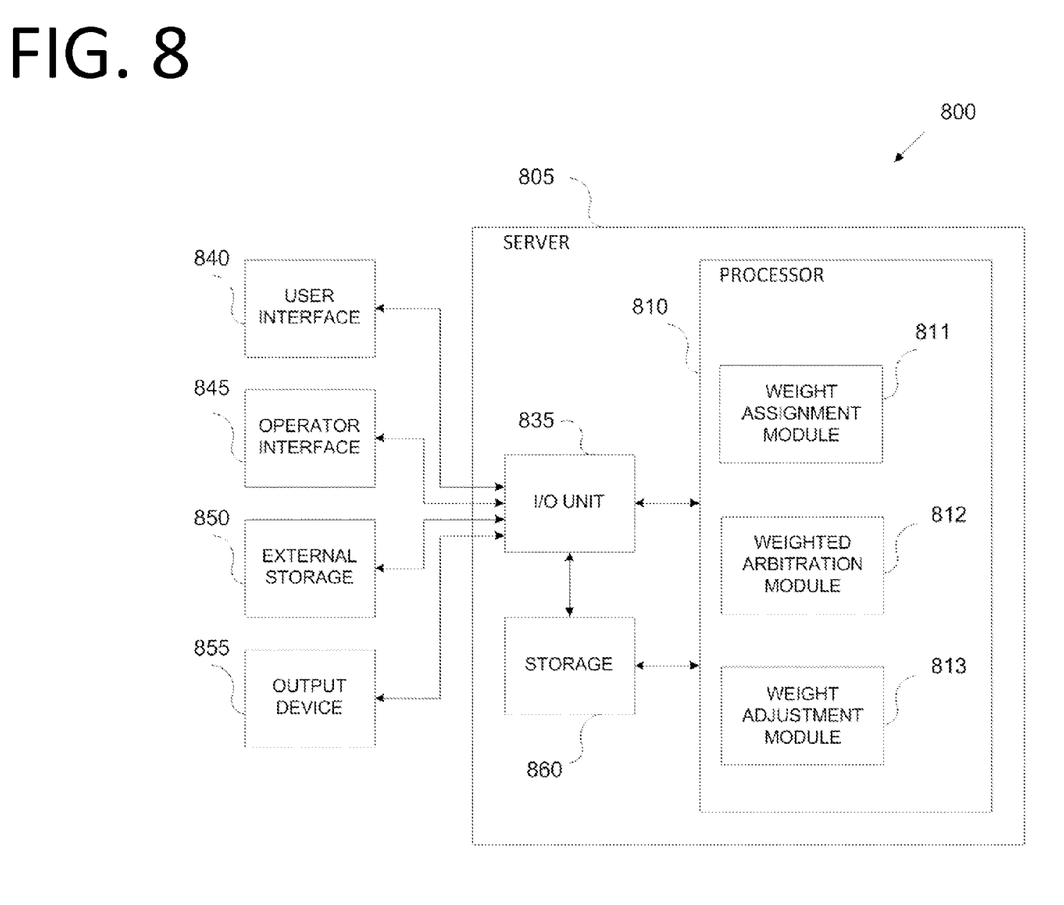
FIG. 8 illustrates a computer/server block diagram upon which the example implementations described herein may be implemented.

FIG. 8 illustrates an example computer system 800 on which example implementations may be implemented. The computer system 800 includes a server 805 which may involve an I/O unit 835, storage 860, and a processor 810 operable to execute one or more units as known to one of skill in the art. The term "computer-readable medium" as used herein refers to any medium that participates in providing instructions to processor 810 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 840 and operator interfaces 845 which may utilize input devices such as a keyboard, mouse, touch device, or verbal command.

The server 805 may also be connected to an external storage 850, which can contain removable storage such as a portable hard drive, optical media (CD or DVD), disk media or any other medium from which a computer can read executable code. The server may also be connected an output device 855, such as a display to output data and other information to a user, as well as request additional information from a user. The connections from the server 805 to the user interface 840, the operator interface 845, the external storage 850, and the output device 855 may via wireless protocols, such as the 802.11 standards, Bluetooth® or cellular protocols, or via physical transmission media, such as cables or fiber optics. The output device 855 may therefore further act as an input device for interacting with a user.

The processor 810 may execute one or more modules. The weight assignment module 811 may be configured to compute the weights to be assigned to various channels at various nodes in the NoC based on the traffic profile and bandwidth information. Weights may be used for the weighted arbitration at various NoC nodes. The weighted arbitration module 812 present at every NoC node implements the weighted arbitration; a deficit counter based implementation of weighted arbitration policy or an alternative implementations may be used. The weight adjustment module 813 may be configured to dynamically adjust the weight of various channels at various NoC nodes, by monitoring the activity of the flows over the channel.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
   computing weights for one or more channels of a Network on Chip (NoC) based on a bandwidth requirement of traffic flows for each of the one or more channels;
   assigning the computed weights to the one or more channels of the NoC;
   conducting weighted arbitration at nodes of the NoC; and
   dynamically adjusting at least one of the computed weights assigned to the one or more channels of the NoC, based on activity of the traffic flows of the one or more channels corresponding to the at least one of the computed weights;
   wherein the traffic flows that go over the each of the one or more channels are based on routes used in the NoC, wherein the traffic flows are representative of source/destination pairs across the routes used in the NoC.

2. The method of claim 1, wherein the dynamically adjusting the computed weights comprises,
   monitoring the traffic flows of the one or more channels and determining an activity level of each of the traffic flows over a number of cycles.

3. The method of claim 1, wherein the conducting weighted arbitration at the nodes of the NoC is based on the dynamically adjusted computed weights.

4. The method of claim 1, further comprising:
   determining at least one of the computed weights to be static and not dynamically adjustable.

5. The method of claim 1, wherein the NoC comprises one of a heterogeneous 2-D mesh, heterogeneous 2.5-D mesh, heterogeneous 3-D mesh, Taurus NoC interconnect and ring NoC interconnect.

6. A non-transitory computer readable storage medium storing instructions for executing a process, the instructions comprising:
   computing weights for one or more channels of a Network on Chip (NoC) based on a bandwidth requirement of traffic flows for each of the one or more channels;
   assigning the computed weights to the one or more channels of the NoC;
   conducting weighted arbitration at nodes of the NoC; and
   dynamically adjusting at least one of the computed weights assigned to the one or more channels of the NoC, based on activity of the traffic flows of the one or more channels corresponding to the at least one of the computed weights;

wherein the traffic flows that go over the each of the one or more channels are based on routes used in the NoC, wherein the traffic flows are representative of source/destination pairs across the routes used in the NoC.

7. The non-transitory computer readable storage medium of claim 6, wherein the dynamically adjusting the computed weights comprises monitoring the traffic flows of the one or more channels and determining an activity level of each of the traffic flows over a number of cycles.

8. The non-transitory computer readable storage medium of claim 6, wherein the conducting weighted arbitration at the nodes of the NoC is based on the dynamically adjusted computed weights.

9. The non-transitory computer readable storage medium of claim 6, wherein the instructions further comprise determining at least one of the computed weights to be static and not dynamically adjustable.

10. A system, comprising:
a processor configured to execute one or more modules;
a weight assignment module configured to compute weights for one or more channels of a Network on Chip (NoC) based on a bandwidth requirement of traffic flows for each of the one or more channels and to assign the computed weights to the one or more channels of the NoC;
a weighted arbitration module configured to conduct weighted arbitration at nodes of the NoC; and
a weight adjustment module configured to dynamically adjust at least one of the computed weights assigned to the one or more channels of the NoC, based on activity of the traffic flows of the one or more channels corresponding to the at least one of the computed weights;

wherein the traffic flows that go over the each of the one or more channels are based on routes used in the NoC, wherein the traffic flows are representative of source/destination pairs across the routes used in the NoC.

11. The system of claim 10, wherein the weight adjustment module is configured to dynamically adjust the computed weights by monitoring the traffic flows of the one or more channels and by determining an activity level of each of the traffic flows over a number of cycles.

12. The system of claim 10, wherein the weighted arbitration module is configured to conducting weighted arbitration at the nodes of the NoC based on the dynamically adjusted computed weights.

13. The system of claim 10, wherein the weight adjustment module is configured to determine at least one of the computed weights to be static and not dynamically adjustable.

14. The system of claim 10, wherein the NoC comprises one of a heterogeneous 2-D mesh, heterogeneous 2.5-D mesh, heterogeneous 3-D mesh, Taurus NoC interconnect and ring NoC interconnect.

* * * * *